March 28, 1950  G. A. MORGAN ET AL  2,502,101
FABRIC AND METHOD OF MAKING SAME
Filed March 2, 1949  5 Sheets-Sheet 1
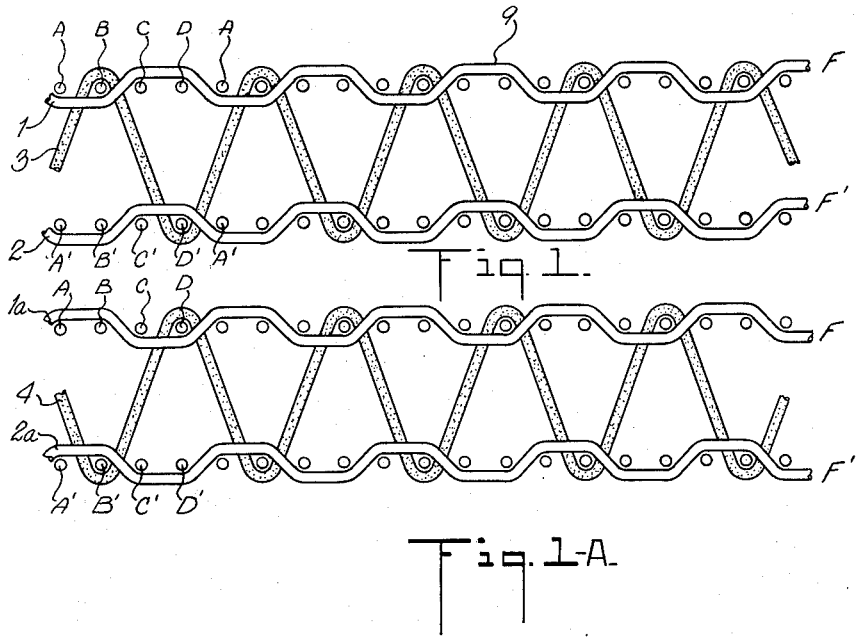
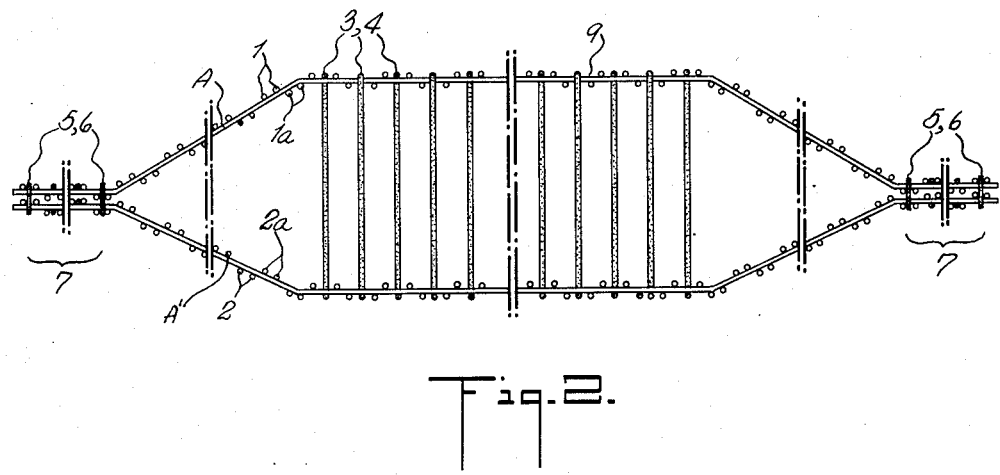
INVENTORS
GEORGE A. MORGAN
ARTHUR B. ROBERTSHAW JR.
BY
Edward G. Roe
ATTORNEY March 28, 1950 G. A. MORGAN ET AL 2,502,101
FABRIC AND METHOD OF MAKING SAME
Filed March 2, 1949 5 Sheets-Sheet 2
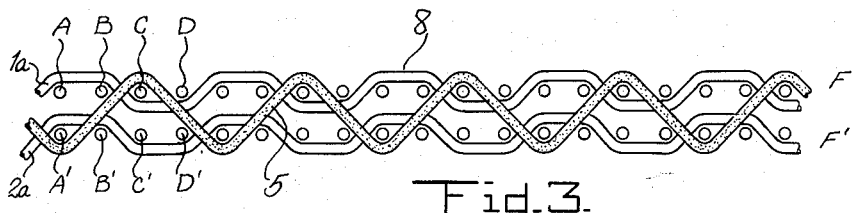
Fig.3.
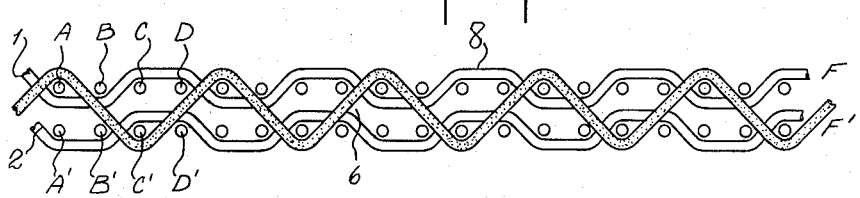
Fig.3-A.
Fig.4.
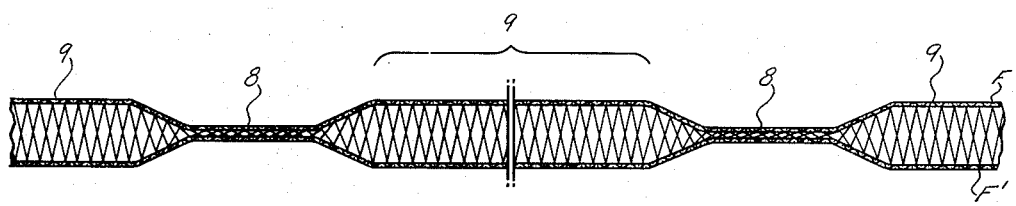
Fig.5.
INVENTORS
GEORGE A. MORGAN
ARTHUR B. ROBERTSHAW JR
BY
Edward G. Roe
ATTORNEY March 28, 1950  G. A. MORGAN ET AL  2,502,101
FABRIC AND METHOD OF MAKING SAME
Filed March 2, 1949  5 Sheets-Sheet 3

INVENTORS
GEORGE A. MORGAN
ARTHUR B. ROBERTSHAW JR.
BY
Edward G. Roe
ATTORNEY

March 28, 1950  G. A. MORGAN ET AL  2,502,101
FABRIC AND METHOD OF MAKING SAME

Filed March 2, 1949  5 Sheets-Sheet 5

INVENTORS
GEORGE A. MORGAN
ARTHUR B. ROBERTSHAW JR.
BY
Edward G. Roe
ATTORNEY

Patented Mar. 28, 1950

2,502,101

UNITED STATES PATENT OFFICE 2,502,101

FABRIC AND METHOD OF MAKING SAME

George A. Morgan, Glendale, and Arthur B. Robertshaw, Jr., Woonsocket, R. I., assignors to Woonsocket Falls Mill, Woonsocket, R. I., a corporation of Rhode Island and Providence Plantations Application March 2, 1949, Serial No. 79,184

12 Claims. (Cl. 139—384)

In a generic sense, the invention relates to a composite fabric and a process for making it.

Broadly, the invention is directed to the provision of and process for manufacturing a composite fabric comprising two plies—each consisting of warp and filling threads—which are connected by "tie" warp threads common to both plies, the two plies having a common portion at each side and common portions or headings across the fabric at predetermined intervals.

The terms "portion" and "portions" herein include a selvage or selvages at which the plies meet at an edge warpwise of the composite fabric and also include the terms "heading" and "headings" where the cloth is woven together fillingwise of the composite fabric. The words "ply" and "plies" include the layers of a double cloth construction which are woven in the loom at the same time.

The specific objects of the invention are set forth below:

One principal object of the invention is to produce a composite fabric, the body of which comprises two separate plies, one of which is spaced at a predetermined distance above the other, connected thereto by "tie" warp threads, the two component plies converging at their sides and at a plurality of headings to form separable units, each having a common portion at all edges, a space within the body of each unit unoccupied save by the connecting "tie" warp threads; another object is the provision of a composite fabric wherein the two plies which are joined together by the "tie" warp threads have a space within the body thereof, a common portion at each side and common portions or headings across the fabric at predetermined intervals.

Additionally, the invention comprehends the production of a composite fabric in which the two component plies are spaced apart at a predetermined distance, and each comprising a series of warp and filling threads, are connected together by "tie" warp threads common to both plies, have common portions at their sides and at a plurality of headings, the said composite fabric adapted to be cut or sheared into a plurality of units, each having a common portion at all edges thereof, the space within the body of each unit capable of holding compressible or non-compressible materials upon treating of the fabric material.

Principally, the invention provides a composite fabric comprising two spaced-apart plies, wherein the filling threads of the two component plies are kept in perfect register and in the same vertical plane at the common portions, so that the space between the plies in the body thereof, may be maintained at maximum distance, when said space is filled with a compressible or non-compressible substance. This juxtaposition of the filling threads at the common portions overcomes the tendency of the "tie" warp threads to "skew," when a composite fabric is woven by conventional methods, is subsequently cut into a plurality of units, and the outer edges are sealed or sewn together to close said edges. As a result of such "skewing," the maximum and extreme distance is not maintained between the component plies.

Other objects of the invention may be disclosed in the following description.

In the drawings:

Fig. 1 is a warpwise view of a section of our fabric taken along line 1—1 of Fig. 7.

Fig. 1-A is a view of an adjacent course similar to Fig. 1.

Fig. 2 is a cross-sectional fragmentary view between headings illustrating the converging of the two component plies toward and at opposite sides thereof taken along line 2—2 of Fig. 7.

Fig. 3 is a warpwise view of a section of our fabric taken along line 3—3 of Fig. 7.

Fig. 3-A is a view of an adjacent course similar to Fig. 3.

Fig. 4 is a sectional view looking into a selvage side showing a modification of a weave to produce a common portion.

Figure 5:
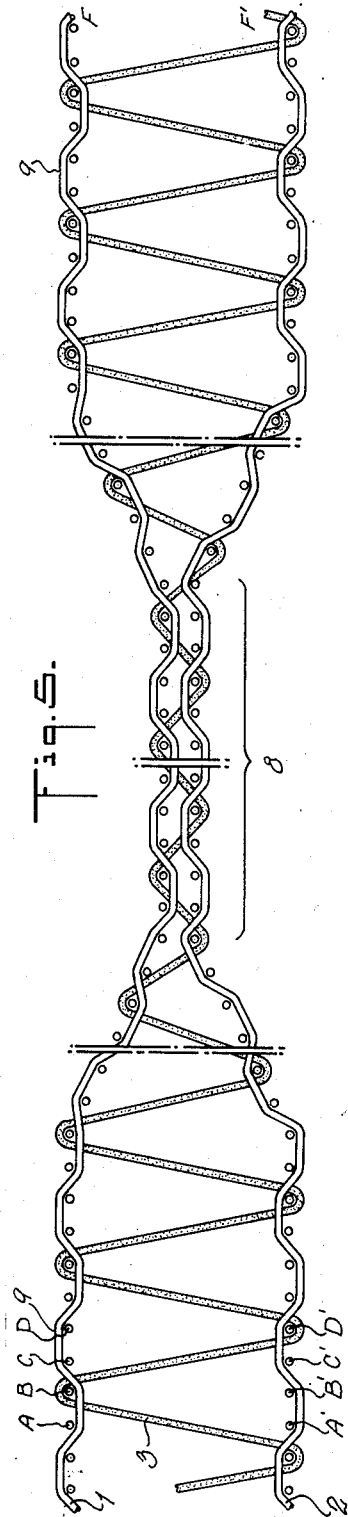
Figure 7:
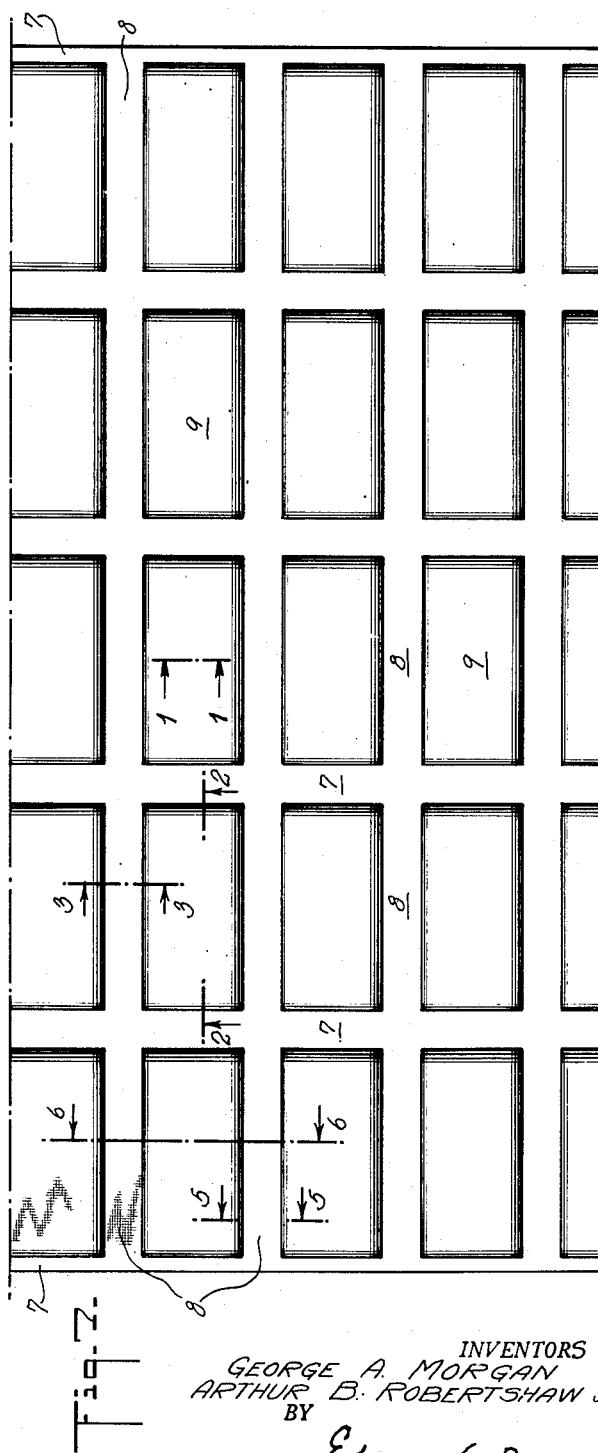

Fig. 5 illustrates a warpwise view of a heading taken along line 5—5 of Fig. 7.

Fig. 6 is a sectional view taken along line 6—6 of Fig. 7.

Fig. 7 is a view of a portion of the fabric as it is woven.

Figure 8:
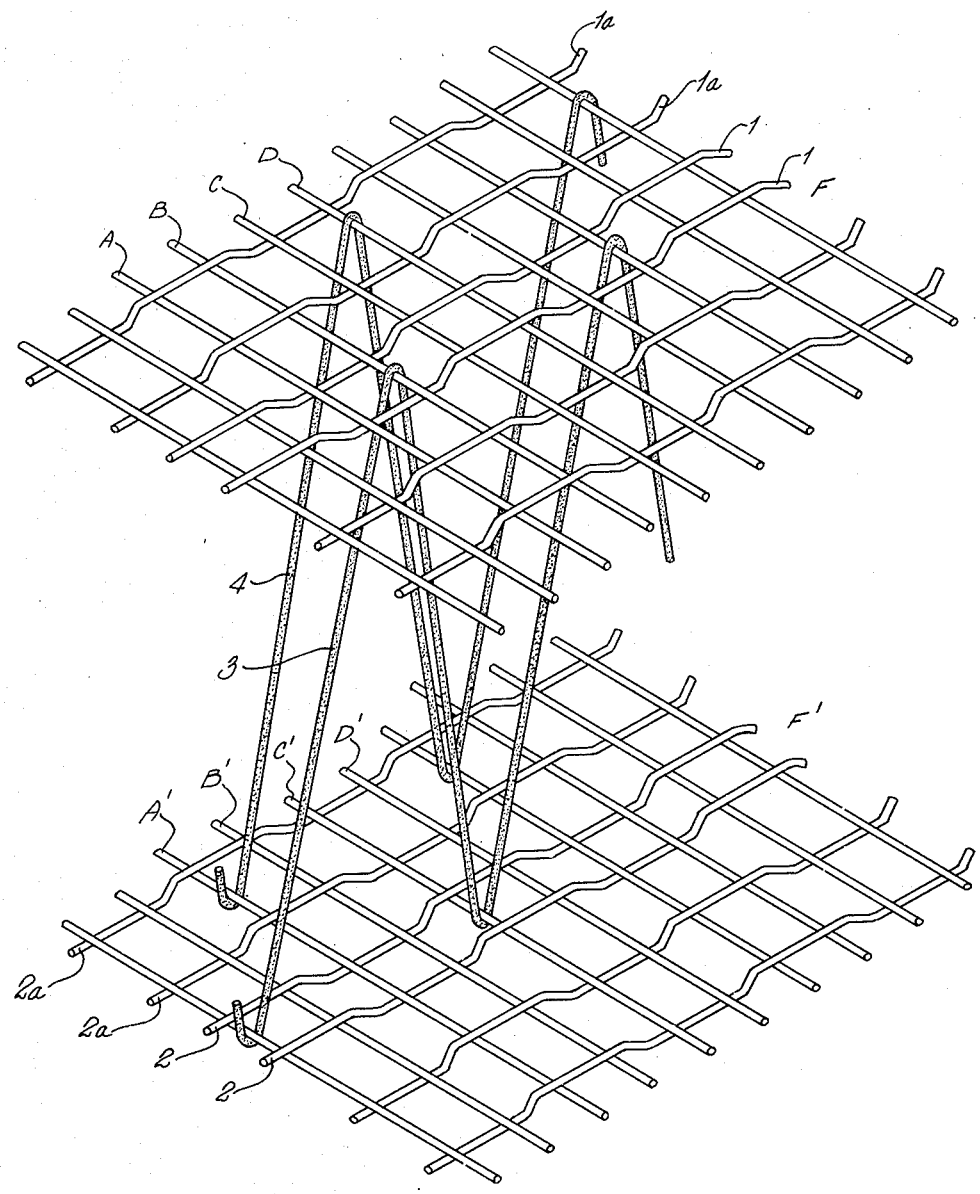

Fig. 8 is a diagrammatic perspective view showing an interlacing in the body of the composite fabric.

Figure 9:
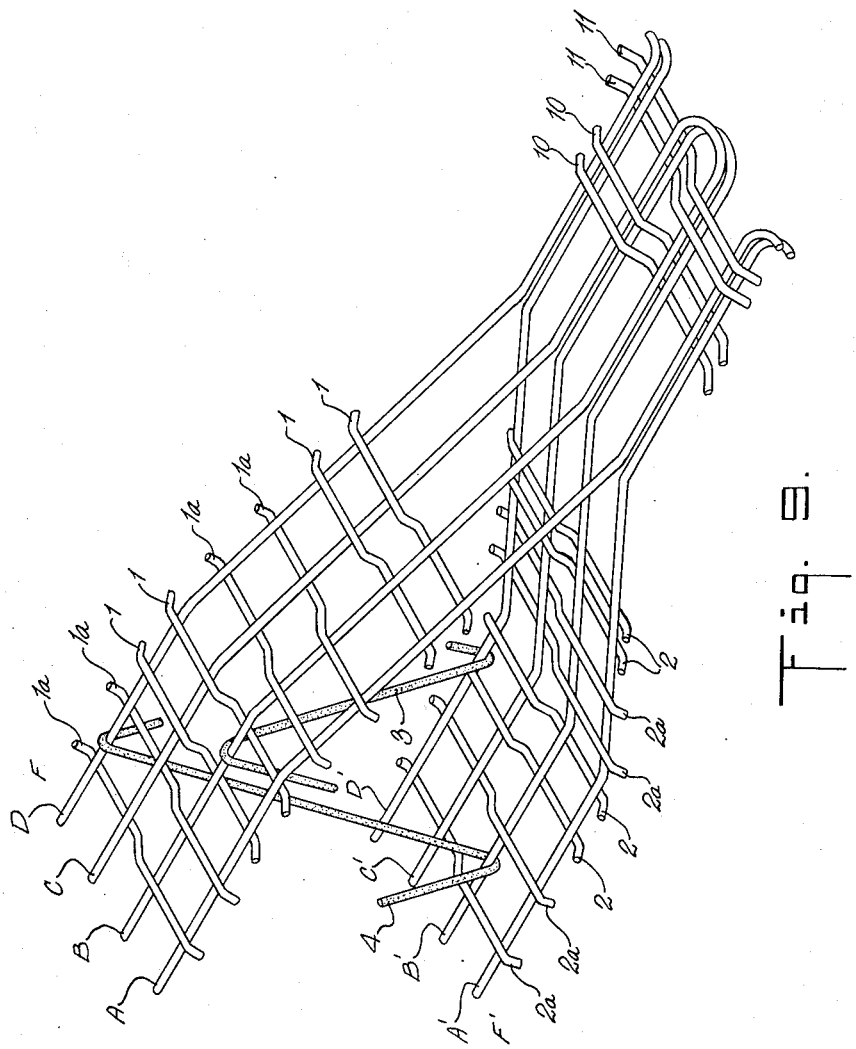

Fig. 9 is a diagrammatic perspective view showing a modification of a weave to produce a common portion.

By way of introduction, the term "heading" or "common heading" when used, refers to the predetermined intervals at which, filling-wise, or across the fabric, our composite fabric includes a common portion.

For purposes of explication, listed below are the reference numerals and letters and the corresponding components to which they refer, unless otherwise noted, the respective positions referred to being with reference to the composite fabric as it is positioned in and woven in a loom.

F—the upper ply.
F'—the lower ply.
1 and 1a—the warp threads of the upper ply.
A, B, C, D—filling threads of the upper ply.
2 and 2a—warp threads of the lower ply.
A', B', C', D'—filling threads of the lower ply.
3, 4—"tie" warp threads common to upper and lower plies.
5, 6—another set of "tie" warp threads.
7—the common portion running longitudinally at the sides of or medially of the fabric.
8—the headings, or common portion across the fabric.
9—the "body" of the composite fabric.
10, 11—another set of warp threads running through both upper and lower backing plies.

The usual type of loom capable of weaving a double cloth plush or pile fabric is employed in our process, and we deliver the component warp threads from three separate warp beams: (1) from one warp beam or roll are delivered warp threads 1 and 1a, and 2 and 2a; (2) a second warp beam supplies "tie" warp threads 3, 4; (3) a third warp beam delivers "tie" warp threads 5, 6. In a modification of the invention a separate warp beam supplies warp threads 10, 11.

The composite fabric generally comprises two plies F and F', the former including warp threads 1 and 1a interlaced with filling threads A, B, C, D; the latter comprising warp threads 2 and 2a interwoven with filling threads A', B', C', D'; and "tie" warp threads 3, 4, 5 and 6 connecting the two plies in the manner hereinafter explained.

In weaving the fabric, as shown in Fig. 8, a single throw of the double shuttle inserting filling pick A, A' would pass under warp threads 1a and 2a, and over warp threads 1 and 2. The return throw would cast filling B, B' over warp threads 1 and 2, under the loop of "tie" warp thread 3 inserted between warp threads 1; and under warp threads 1a and 2a.

In the next pick the shuttles would cast filling C, and C', over warp threads 1a, 2a and under warp 1 and 2.

In the fourth pick, filling D—D' would be thrown under warp threads 1 and 2, over the loop of "tie" warp thread 3 as it connects the bottom ply; over warp threads 1a, 2a; and under the loop of "tie" warp thread 4.

The "tie" warp threads 3, 4 are so harnessed that each thread is looped about every fourth filling thread in each fabric, the filling threads in either ply about which any "tie" warp thread is looped being staggered with respect to the filling about which the same "tie" warp thread is looped in the other ply, warp threads 5, 6 being woven simultaneously in the same manner.

It should be understood that the weave depicted in the drawings and referred to herein is illustrative only and in carrying out the invention it is possible, and contemplated, that other weaves may be employed, without departing from the invention. Further, in the embodiments herein warps and filling of any suitable yarn or texture may be used, for example cotton.

While the interlacing depicted in Fig. 8 is applicable to the weaving of the "body" of the composite fabric, reference is now made to the weaving of the common portions 7 at opposite sides of the composite fabric. Here, as illustrated in Fig. 2 the opposing plies F and F' are bent toward each other toward the edges and at said edges "tie" warp threads 5 and 6, as shown in Fig. 3, tightly bind the upper and lower plies together, and maintain the respective filling threads A—A'; B—B' superimposed one above the other in perfect register and in the same vertical plane, as shown in Fig. 3. The bending toward and binding at the edges is accomplished by delivering warp threads 5, 6 to the loom under greater tension than that maintained in delivering warp threads 3, 4, the latter also being supplied from a separate warp roll.

In Fig. 4 we show a modification of a weave which we may employ at the edges 7, wherein two sets of warp threads 1, 2 are simultaneously but oppositely shifted from one shed to the other every pick of the loom, two picks being cast in every shed.

In Fig. 9 we show another modification of a weave which may also be employed at the edges wherein two series of warp threads 10 and 11 are used to produce the common portion without necessitating the use of "tie" warp threads for this purpose. This method could also be employed to produce the medially disposed common portions.

As illustrated in Fig. 2, there is produced a common portion, that is, a portion common to both plies at opposite sides of the composite fabric, which may also be produced longitudinally of the fabric, if desired.

With particular reference to Fig. 5, a warpwise view of one course at a common heading, it will be noted that the spaced-apart plies F and F' are caused to converge at common heading 8 as "tie" warp threads 3, 4 are placed under greater tension by manually or mechanically disengaging the drive on the warp delivery roll from which they are being supplied to the loom. The beating-up of the reed thus takes up the slack of threads 3, 4 resulting in the joining together of plies F and F' at heading or common portion 8, with filling threads A—A'; B—B' etc. being juxtaposed in perfect register and lying in the same vertical plane. As soon as the slack in threads 3, 4 is fully taken up, the warp-beam delivering said threads is re-engaged to again build up the distance between the two plies in the body 9 thereof.

Headings 8 are woven across the fabric at predetermined intervals until the "run" is completed.

In the embodiment illustrated, the warpwise common portions are shown, as in Fig. 2, at opposite sides of the fabric. For certain uses, it may be advantageous to provide a plurality of common portions running longitudinally, or warpwise of the fabric, at predetermined, spaced intervals, between the sides of the fabric, with "tie" warp threads 5, 6 under constant, added tension, being woven into the fabric at said spaced intervals to cause the component plies to converge and a plurality of said added warpwise common portions to be formed, also denoted by the reference numeral 7, as in Fig. 7.

The method of weaving produces a composite fabric consisting of two plies, each consisting of warp and filling threads, the two plies interconnected by a plurality of series of "tie" warp threads, each series being delivered from separate warp beams, the warp threads of the two plies also being delivered from a separate warp beam, the two plies having common portions 7 and a plurality of headings or common portions 8 across the fabric at predetermined intervals. The completed composite fabric is cut or sheared to produce a plurality of units each having a common portion at each edges, the body of each unit consisting of one ply F spaced at a predetermined distance above ply F' and having within the body a space occupied only by the "tie" warp threads in the interstices. The distance the plies are spaced apart in the body thereof is determined by the spread permitted by the connecting "tie" warp threads 3 between the loops connecting plies F—F'. A principal advantage of having common portions at all edges, and the filling threads of the upper and lower plies registering and lying in the same vertical plane, is that "tie" warp threads 3, 4 between the plies are prevented from "skewing" and maximum distance is maintained between the plies.

While, in the embodiment shown, the common heading or portion 8 is described as being "across" the composite fabric, that is transversely thereof, by appropriate manipulation of the respective warp beams delivering "tie" warp threads 3, 4 and 5, 6—said heading can be formed diagonally across the fabric, or in directions other than transversely.

Upon cutting of a finished "run" of a composite fabric—into a plurality of units having a common portion at all edges thereof, and a space within the body of said fabric, the construction lends itself to treatment or application of other substances, and compressible or non-compressible materials may be injected and contained within the space within the body of the composite fabric, said space and distance between the superimposed plies being maintained, as hereinbefore explained, at maximum distance.

Each unit, by virtue of having common portions at all edges, and interconnecting threads within the space in the body thereof, is a textile article of exceptional strength and can be used, for example as a mattress, when filled with air, or as a snowshoe, and for many other purposes.

We reserve the right to make such changes or modifications as may come within the scope of the appended claims.

We claim:

1. A composite fabric consisting of two plies, each including series of interwoven warp and filling threads and interconnecting "tie" warp threads common to both plies and a separate series of "tie" warp threads for binding the plies together at the sides, said plies having a plurality of common portions at the sides thereof and common portions across the composite fabric at predetermined intervals.

2. A textile article consisting of two plies, interconnected by "tie" warp threads and a separate series of "tie" warp threads for binding the plies together at the sides, the two plies converging at the sides and ends thereof and having a space within the body of the composite fabric positioned intermediate the said converging sides and ends.

3. A composite fabric including two plies, each woven of interlacing series of warp and filling threads, interconnecting "tie" warp threads between the plies and common to both and a separate set of "tie" warp threads for drawing the plies together warpwise at the edges and at predetermined intervals fillingwise of the fabric, the said composite fabric converging at the sides and at a plurality of predetermined intervals across said composite fabric, and adapted to be separated into a plurality of units each having common portions at all edges and a space within the body positioned intermediate said edges.

4. In a double fabric, two plies woven simultaneously and spaced at a predetermined distance from each other, each ply including interwoven warp and filling threads, common "tie" warp threads connecting the two plies and a separate set of "tie" warp threads for drawing the plies together warpwise at the edges and at predetermined intervals fillingwise of the fabric, the said fabric having common portions at the sides and between the sides thereof and common headings across the fabric at predetermined intervals.

5. A textile article consisting of two plies, each including series of interwoven warp and filling threads, "tie" warp threads interconnecting the two plies and a separate set of binder warp threads for binding the plies together at the sides, said plies having common portions at all edges thereof, the corresponding filling threads of the respective plies registering and lying in the same vertical plane at the sides of the spaces.

6. A composite fabric including a plurality of textile articles, each article consisting of two plies, each having series of interwoven warp and filling threads, "tie" warp threads interconnecting the two plies and a separate series of "tie" warp threads for binding the plies together at the edges, said plies having common portions at all edges thereof, the corresponding filling threads of the respective plies registering and lying in the same vertical plane at the sides of the spaces between the common portions.

7. A composite fabric adapted to be separated into a plurality of textile articles, each article consisting of two plies, each comprising series of interwoven warp and filling threads, "tie" warp threads interconnecting the two plies and a separate series of "tie" warp threads for drawing the plies together warpwise at the sides and at selected intervals fillingwise of the fabric, said plies having common portions at all edges thereof, the corresponding filling threads of the respective plies registering and lying in the same vertical plane at the sides of the spaces, said article including a space between the plies intermediate the edges.

8. A composite fabric consisting of two plies, each including series of interwoven warp and filling threads and interconnecting "tie" warp threads common to both plies and a separate series of "tie" warp threads for drawing the plies together warpwise at the sides and at selected intervals fillingwise of the fabric, said plies having a plurality of common portions warpwise, and common portions or headings across the said composite fabric at predetermined intervals.

9. A composite fabric comprising two plies, each including interwoven warp and filling threads, a plurality of series of "tie" warp threads common to both plies, one series of "tie" warp threads securing the sides of the plies together at the edges, the second series holding the body of the plies spaced at a predetermined distance from each other at intervals and securing the plies together at headings at other predetermined intervals.

10. The process of weaving a composite fabric consisting of interweaving a plurality of warp threads with filling threads to form two plies, and simultaneously interweaving series of "tie" warp threads with the filling threads of both plies, one series of said latter warp threads under constant tension to closely unite the sides of said plies to form a common portion, a different series of "tie" warp threads simultaneously interwoven with the filling threads of both plies under varying tension to unite the plies at maximum distance when woven under one tension and uniting the said plies across the fabric at predetermined intervals when woven under a different tension.

11. The process of weaving a composite fabric consisting of interweaving a plurality of warp threads with filling threads to form two plies, simultaneously interweaving series of "tie" warp threads with the filling threads of both plies, varying the tension on different series of said "tie" warp threads to unite the plies at common portions, at the sides at spaced intervals therebetween and at predetermined intervals across the plies and to unite the plies at maximum distances therebetween.

12. The process of weaving a double fabric consisting of interweaving a plurality of warp and filling threads to form two superimposed plies, simultaneously interweaving a plurality of series of "tie" warp threads common to both plies, manipulating the delivery of different series of "tie" warp threads during the weaving process to form common portions at and between the sides of said plies and common headings at predetermined intervals across said plies.

GEORGE A. MORGAN.
ARTHUR B. ROBERTSHAW, Jr.

REFERENCES CITED

The following references are of record in the file of this patent:

UNITED STATES PATENTS

| Number | Name | Date |
|---|---|---|
| 286,711 | Laird | Oct. 16, 1883 |
| 328,379 | Bray | Oct. 13, 1885 |
| 1,352,704 | Van Heusen | Sept. 14, 1920 |
| 1,573,807 | Chase | Feb. 23, 1926 |
| 2,046,039 | Schaar | June 30, 1936 |
| 2,072,152 | Blake et al. | Mar. 2, 1937 |
| 2,208,256 | Goldsmith | July 16, 1940 |
| 2,209,874 | Dempsey | July 30, 1940 |